Patented Oct. 11, 1949

2,484,683

UNITED STATES PATENT OFFICE 2,484,683

CYANOBUTENYL ACETOACETIC ESTERS

Herman A. Bruson, Rydal, Pa., assignor, by mesne assignments, to Rohm & Haas Company, Philadelphia, Pa., a corporation of Delaware No Drawing. Application January 24, 1948,
Serial No. 4,205

5 Claims. (Cl. 260—465.4)

This invention relates to addition products of 1-cyano-1,3-butadiene and acetoacetic ester. When 1-cyano-1,3-butadiene is added to an ester of acetoacetic acid containing an alkaline catalyst, addition accompanied by a change in position of the double bond occurs as follows:

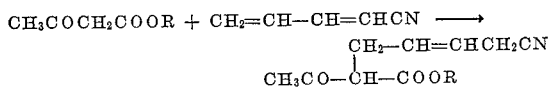

If a second mole of 1-cyano-1,3-butadiene is added, a second —CH$_2$—CH=CH—CH$_2$CN is introduced:

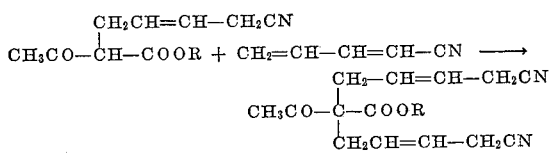

These new products are of interest as intermediates for the preparation of long chain polycarboxylic acids, amides, and esters and as plasticizers.

There may be used as a starting material any of the esters of acetoacetic acid having the formula

wherein R is a hydrocarbon group. R, for example, may be methyl, ethyl, isopropyl, butyl, methylbenzyl, butylbenzyl, octyl, lauryl, octadecyl, cyclohexyl, methylcyclohexyl, benzyl, allyl, undecenyl, phenyl, cresyl, butylphenyl, or other hydrocarbon group.

Typical alkaline catalysts which can be used for the purpose of this invention are the oxides, hydroxides, hydrides, or alcoholates of the alkali metals, the alkali metals themselves, or strongly basic quaternary ammonium hydroxides such as benzyl trimethyl ammonium hydroxide or dimethyl dibenzyl ammonium hydroxide. Amounts of catalysts of the order of 1% to 20% of the weights of the reactants are generally useful. Inert solvents such as dioxane, tertiary butyl alcohol or benzene can be used to moderate the reaction. The reaction takes place between 10° C. and 70° C., the range of 25° C. to 50° C. being preferred. External cooling may be used to control the reaction. After completion of the reaction and before the products are separated, the catalyst is advantageously destroyed, as by neutralization with an acid.

The following examples illustrate this invention:

Example 1

To a stirred solution of 23.2 g. of methyl acetoacetate (0.2 mole), 12 g. of tertiary butyl alcohol, and 2 g. of a 40% aqueous benzyl trimethyl ammonium hydroxide solution there was added dropwise 32 g. of 1-cyano-1,3-butadiene (0.4 mole) during the course of twenty minutes. The exothermic reaction was held at 30°–35° C. during the addition and for about twenty minutes thereafter by occasional external cooling. After the reaction mixture had been stirred for one hour at room temperature, a drop of the material was placed on a watch glass and scratched whereupon it became crystalline. This was used for seeding the main reaction mixture after an additional 30 cc. of tertiary butyl alcohol had been added. The mixture formed a thick crystalline mass upon standing for 24 hours. The free alkali was neutralized with dilute hydrochloric acid. The product was filtered off, washed with a little tertiary butyl alcohol, and dried to give a yield of 43 g. (78%). Upon recrystallization from methanol it formed fine, white crystals having a melting point of 82–3°. The analysis of this product gave the following data: Found: carbon, 65.68%; hydrogen, 6.69%; nitrogen, 10.10%, compared with theoretical values of carbon, 65.69%; hydrogen, 6.57%; and nitrogen, 10.22% for the compound methyl alpha,alpha-bis(4-cyanobutenyl) acetoacetate.

Example 2

To a stirred mixture of 27.2 grams of ethyl acetoacetate, 14 grams of tertiary butyl alcohol, and 2 grams of a 40% aqueous benzyl trimethyl ammonium hydroxide solution there was added dropwise 33 grams of 1-cyano-1,3-butadiene while the reaction mixture was held at 33–5° C. by external cooling. The mixture was stirred for 24 hours thereafter at room temperature, neutralized with dilute hydrochloric acid, and washed twice with water. The residual oil was dried in vacuo and then distilled at 0.4 mm. pressure. The product came over at 200°–235° C. (0.4 mm.) as a very viscous oil, which crystallized on standing, in a yield of 50 grams. Upon recrystallization from ethanol, it formed white crystals having a melting point of 76°–77° C. The analysis of this product gave the following data: Found: carbon, 66.78%; hydrogen, 7.08%; nitrogen, 9.58%, compared with theoretical values of carbon, 66.66%; hydrogen, 6.94%; and nitrogen 9.72% for the compound ethyl alpha,alpha-bis(4-cyanobutenyl) acetoacetate.

*Example 3*

To a stirred mixture of 63 grams of ethyl acetoacetate, 60 grams of tertiary butyl alcohol, and 3 grams of a 40% aqueous benzyl trimethyl ammonium hydroxide solution there was added dropwise 38 grams of 1-cyano-1,3-butadiene at 30°–45° C. with occasional cooling. The mixture was stirred for 24 hours at room temperature, then neutralized with hydrochloric acid, washed several times with water, and evaporated to dryness in vacuo. The residual oil (100 grams) upon vacuum distillation gave (a) 19 grams of an oil boiling at 155°–165° C. (0.1 mm.) and (b) 51 grams of oil boiling from 220° to 240° C. (0.1 mm.). Upon redistillation Fraction (a) yielded 11 grams of ethyl alpha-(4-cyanoethyl) acetoacetate as a pale yellow oil boiling at 150°–152° C. (0.6 mm.) having a refractive index, $N_D^{20}$, of 1.4613 and a density, $d_4^{20}$, of 1.0520. The analysis of this product gave the following data: Found: carbon, 63.19%; hydrogen, 7.15%; nitrogen 6.67% while the theoretical values were carbon, 63.15%; hydrogen, 7.17%; and nitrogen, 6.69% for the compound ethyl alpha-(4-cyanobutenyl) acetoacetate. Fraction (b) crystallized on standing and was identical with the product from Example 2.

Thus, by reaction of an ester of acetoacetic acid and 1-cyano-1,3-butadiene in the presence of an alkaline catalyst there are obtained esters of the general formula

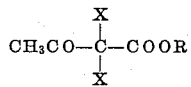

where one X is the —CH₂—CH=CH—CH₂CN group and the other X is a member of the class consisting of hydrogen and the

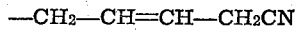

—CH₂—CH=CH—CH₂CN group, R being a hydrocarbon group. The compounds are of particular interest when R is an alkyl group of one to eighteen carbon atoms.

I claim:

1. As a new compound, a substance having the formula

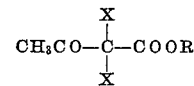

wherein one X is the group

—CH₂—CH=CH—CH₂CN the other X is a member of the group consisting of hydrogen and the

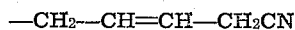

—CH₂—CH=CH—CH₂CN group and R is an aliphatic hydrocarbon group.

2. As a new compound, a substance having the formula

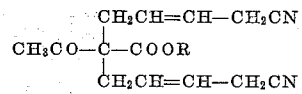

wherein R is an alkyl group of one to eighteen carbon atoms.

3. As a new compound, a substance having the formula

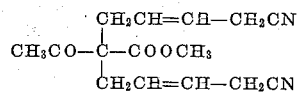

4. As a new compound, a substance having the formula

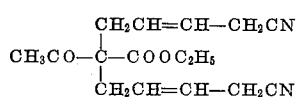

5. As a new compound, a substance having the formula

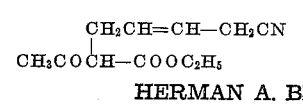

HERMAN A. BRUSON.

REFERENCES CITED

The following references are of record in the file of this patent:

UNITED STATES PATENTS

| Number | Name | Date |
|---|---|---|
| 2,394,962 | Bruson | Feb. 12, 1946 |
| 2,396,626 | Wiest et al. | Mar. 12, 1946 |
| 2,413,917 | Harman | Jan. 7, 1947 |